(12) United States Patent
Rajh et al.

(10) Patent No.: US 7,981,261 B2
(45) Date of Patent: Jul. 19, 2011

(54) INTEGRATED DEVICE AND SUBSTRATE FOR SEPARATING CHARGED CARRIERS AND REDUCING PHOTOCORROSION AND METHOD FOR THE PHOTOELECTROCHEMICAL PRODUCTION OF ELECTRICITY AND PHOTOCATALYTIC PRODUCTION OF HYDROGEN

(75) Inventors: Tijana Rajh, Naperville, IL (US); YuPo Lin, Naperville, IL (US); Nada Dimitrijevic, Downers Grove, IL (US); Seth W. Snyder, Lincolnwood, IL (US); Norman F. Sather, Naperville, IL (US)

(73) Assignee: UChicago Argonne, LLC, Chicago, IL (US)

( * ) Notice: Subject to any disclaimer, the term of this patent is extended or adjusted under 35 U.S.C. 154(b) by 1204 days.

(21) Appl. No.: 11/605,840

(22) Filed: Nov. 28, 2006

(65) Prior Publication Data

US 2007/0105013 A1    May 10, 2007

Related U.S. Application Data

(63) Continuation-in-part of application No. 10/823,509, filed on Apr. 12, 2004, now abandoned, which is a continuation-in-part of application No. 10/755,045, filed on Jan. 9, 2004, now abandoned, which is a continuation of application No. 09/606,429, filed on Jun. 28, 2000, now Pat. No. 6,677,606.

(51) Int. Cl.
*C25B 9/00* (2006.01)

(52) U.S. Cl. ............ 204/252; 136/252; 205/637
(58) Field of Classification Search .......... 204/252; 205/637; 136/252
See application file for complete search history.

(56) References Cited

U.S. PATENT DOCUMENTS

| | | | |
|---|---|---|---|
| 6,299,653 B1 * | 10/2001 | Hoshi et al. | 29/623.1 |
| 7,259,324 B2 * | 8/2007 | Zeira | 136/263 |
| 2004/0265907 A1 * | 12/2004 | Rajh et al. | 435/7.1 |
| 2005/0211290 A1 * | 9/2005 | Deng et al. | 136/252 |
| 2007/0012355 A1 * | 1/2007 | LoCascio et al. | 136/252 |
| 2007/0137998 A1 * | 6/2007 | Sykora et al. | 204/157.15 |

* cited by examiner

*Primary Examiner* — Alexa D. Neckel
*Assistant Examiner* — Nicholas A. Smith
(74) *Attorney, Agent, or Firm* — Cherskov & Flaynik

(57) ABSTRACT

The invention provides a system for separating oppositely-charged charge carriers, the substrate comprising a semiconductor; a ligand in electrical communication with said semiconductor; an ion-exchange resin attached to the semiconductor; an ion-exchange membrane; and an electrical conduit attaching said resin to said membrane. Also provided is a method for producing hydrogen gas, comprising: inducing charge separation in semiconductor particles so as to produce electrons and holes; oxidizing water with the holes to produce oxygen ions and protons, wherein the protons are sequestered from the oxygen ions as the protons are produced; and directing the sequestered protons to a cathode. The invention also provides a method to produce electricity comprising, inducing charge separation in semiconductor particles so as to produce electrons and holes, and completing the circuit with an electron hole transporter.

16 Claims, 5 Drawing Sheets

Figure 4. Configuration of Photovoltaic device to generate electricity

INTEGRATED DEVICE AND SUBSTRATE FOR SEPARATING CHARGED CARRIERS AND REDUCING PHOTOCORROSION AND METHOD FOR THE PHOTOELECTROCHEMICAL PRODUCTION OF ELECTRICITY AND PHOTOCATALYTIC PRODUCTION OF HYDROGEN

This patent application is a Continuation in Part of U.S. patent application Ser. No. 10/823,509 filed on Apr. 12, 2004, now abandoned which is a Continuation in Part of U.S. patent application Ser. No. 10/755,045 filed Jan. 9, 2004, now abandoned which was a Continuation application of U.S. patent application Ser. No. 09/606,429, filed Jun. 28, 2000 now U.S. Pat. No. 6,677,606 B1 which issued on Jan. 13, 2004.

CONTRACTUAL ORIGIN OF THE INVENTION

The United States Government has rights in this invention pursuant to Contract No. W-31-109-ENG-38 between the United States Government and The University of Chicago and/or pursuant to Contract No. DE-AC02-06CH11357 between the United States Government and UChicago Argonne, LLC representing Argonne National Laboratory.

BACKGROUND OF THE INVENTION

1. Field of the Invention

This invention relates to a system for producing electricity and/or hydrogen from a carbon free source, and more particularly, the invention relates to a system for separating ions to produce electricity and hydrogen from water using photoinduced ion exchange.

2. Background of the Invention

Solar-driven water splitting is one of the most promising pathways for production of hydrogen from a carbon free source. However, to date photoelectrochemical (PEC) water splitting has lower solar-to-hydrogen conversion efficiency than photovoltaic-electrolyzer processes.

Semiconductor photocatalysts have been developed in attempts to maximize conversion of solar energy to electrical power. While some of these systems display significant efficiency (15%), they suffer from inherent photo corrosion.

Other systems to photolytically produce hydrogen have been reported such as amorphous silicon/photoelectrochemical multifunction cell and mixed oxide semiconductor photo catalysts. E. L. Millera et al *International Journal of Hydrogen Energy* 28 (2003) 615-623, and Z. Zou, et al. *J. of Photochemistry and Photobiology A: Chemistry* 158 (2003), 145-162. But those systems have had limited success.

Current systems based on metal oxides are corrosion resistant, but have poor overall efficiency because most of them work only in the ultraviolet region. Therefore, the critical technical barriers to realization of photocatalytic hydrogen production (using a PEC) are photoconversion efficiency (photocatalytic activity) and system durability (photocorrosion).

A need exists in the art for a photocatalytic hydrogen producing system based on metal oxide photocatalysts capable of harvesting significant portions of visible photons contacting the photocatalysts (10-15%). There is an additional need in the art for a photocatalytic hydrogen producing system based on metal oxide capable of harvesting significant portions of ultraviolet, X-ray, beta ray, and gamma ray photons contacting the photocatalysts. The systems should produce pure hydrogen such that it is free of contaminant carbon monoxide, carbon dioxide, as well as co-produced oxygen.

SUMMARY OF THE INVENTION

An object of the present invention is to provide a system for photoconversion of solar energy to electricity that overcomes many of the disadvantages of the prior art.

Another object of the present invention is to create a system to use solar energy to split water into a chemical fuel such as hydrogen. A feature of the system is the incorporation of nanoparticle metal oxides that utilize substantially the entire visible spectrum of the solar energy. An advantage of the system is that it can provide high conversion efficiency and system durability for direct hydrogen production from solar energy.

Yet another object of the present invention is to provide a device having high proton separation rates. A feature of the invention is a plurality of reaction compartments. An advantage of the invention is that protons are separated and sequestered from the anodic compartment when oxygen is co-produced during the water oxidation.

Still another object of the present invention is to provide a multi-compartment device for producing hydrogen gas from sequestered protons, wherein the hydrogen gas is produced in a cathodic compartment. A feature of the device is the use of proton-carrying conduits to remove protons from a water splitting compartment to a hydrogen gas formation compartment. An advantage of the device is that pure hydrogen is produced at high efficiency.

Briefly, the invention provides a system for separating oppositely-charged charge carriers, the substrate comprising a semiconductor; a ligand in electric communication with said semiconductor; a covalently-attached bridging conducting polymer; an ion-exchange resin attached to the bridging conductive polymer; an ion-exchange membrane; and an electrical conduit attaching said resin to said membrane.

Also provided is a method for producing electricity comprising: completing the circuit with an electron hole transporter between a bridging conductive polymer and a cathode compartment.

Also provided is a method for producing hydrogen gas, comprising: inducing charge separation in semiconductor particles so as to produce electrons and electron holes; oxidizing water with the holes to produce oxygen ion s and protons, wherein the protons are sequestered from the oxygen ions as the protons are produced; and directing the sequestered protons to a cathode.

The invention also provides a substantially dry system for simultaneously generating hydrogen gas and electricity, the system comprising: a plurality of photo catalysts; an electrically conductive polymer substantially encapsulating the photo catalysts; a cathode in electrical communication with the polymer; and an electrical conduit electrically connecting the photo catalysts to the cathode.

BRIEF DESCRIPTION OF THE DRAWING

Other objects, features, and advantages of the present invention will become apparent from the following description and the accompanying drawings, wherein.

DETAILED DESCRIPTION OF THE INVENTION

Figure 1:
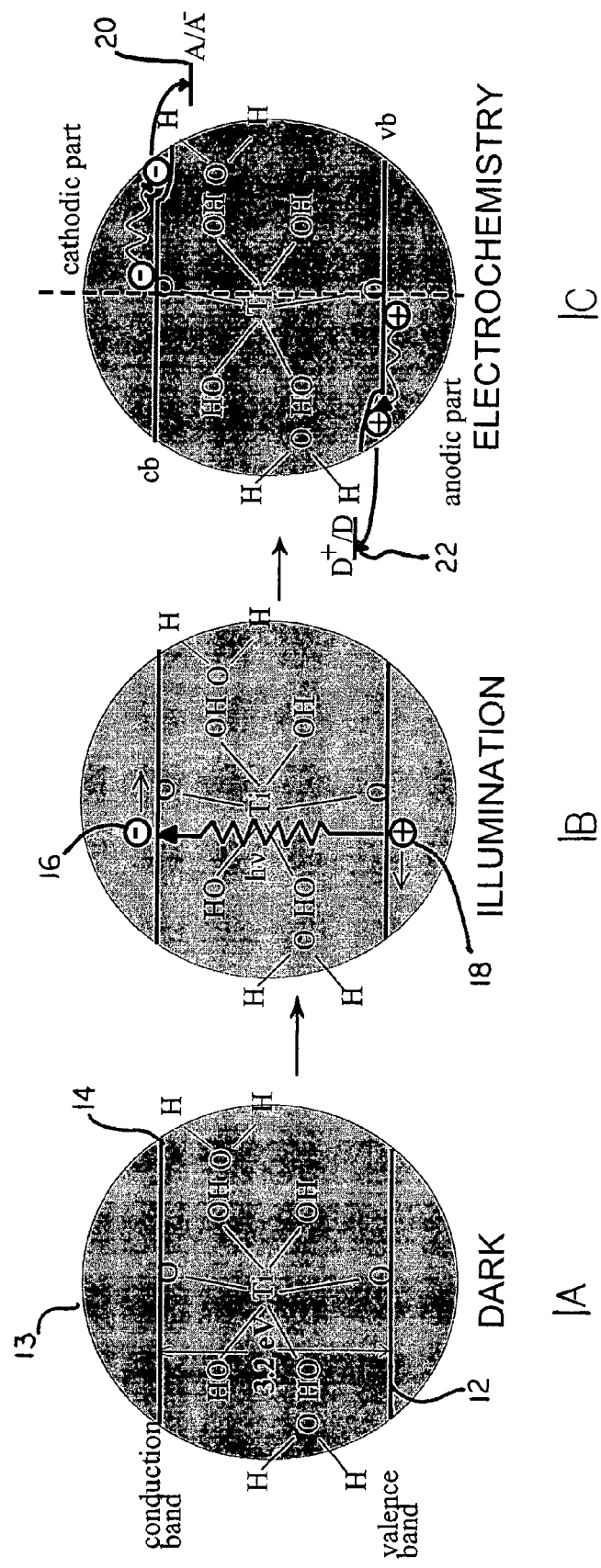
FIG. 1 is a schematic diagram of the electronic state of semiconductor particles, in accordance with features of the present invention.

The inventors have developed substrates to enhance the harvesting of light to produce electricity and ultimately hydrogen gas. The substrates prevent chemical recombination reactions and therefore increase the utilization of photo generated electrons and holes to achieve high photocatalytic efficiencies. The system further provides means for separating hydrogen gas from other fluids generated during charge-separation processes. In addition, other forms of radiation including: ultraviolet light, X-rays, gamma rays, beta rays, or combinations thereof could be used to initiate the photoreaction to produce electricity and hydrogen.

The inventors have found that the quantum efficiency of the invented nano-structured photocatalysts such as surface modified $TiO_2$ can reach as high as 12-20 percent. About 90 percent of the generated protons from water oxidation could be captured and converted. Dopamine-doped $TiO_2$—$ZrO_2$ is capable of utilizing most of the visible light spectrum (65 percent of the total energy from sunlight). The invention provides potential for more than nine percent overall conversion efficiency from solar energy to hydrogen production.

A salient feature of the invented substrates is that they facilitate the production of radical intermediates upon light induced charge pair formation within semiconductor particles. Specifically, nanocrystalline metal oxide semiconductor particles that are durable and are not susceptible to photodegradation (photocorrosion), act as miniaturized electrochemical cells and act as stable and efficient artificial photosynthetic systems. The recombination kinetics in these systems is very fast, on the order of picoseconds (N. Serpone et al. *J. Phys. Chem.*, 99, 16655 (1995)). The inventors have found a way to increase the charge separation by reaction with ligated species and leverage this charge control to produce efficient electron/hole separation mechanisms which leads to sequestered protons and enhanced hydrogen gas production.

As discussed in U.S. Pat. No. 6,677,606 B1, and incorporated herein by reference, surface modification of nanocrystalline metal oxide particles with ortho substituted hydroxylated aromatic ligands was found to result in bidentate coordination of surface Ti atoms. Due to the specific bindings of surface modifiers, the optical properties of small titania particles change and the onset of absorption shifts to the red, compared to unmodified nanocrystallites (for salicylate 0.8 eV, ascorbate 1.6 eV and dopamine 1.85 eV). The binding is exclusively characteristic of small particle colloids (nanoparticles) in the nanocrystalline domain and was found to be a consequence of adsorption induced reconstruction of the nanoparticle surface.

A cornerstone of the invention is the enhanced charge separation and improved optical properties of nanocrystalline semiconductors that involve photo induced interfacial electron transfer from surface modifiers into one or more regions of the semiconductors. The charge pairs are instantaneously separated into two phases, the holes on the donating organic modifier and the donated electrons in the conduction band of the semiconductor.

Surface modifications of the nanocrystalline particle with bidentate ortho-substituted hydroxylated electron donating ligands, combined with light excitation of the modified particle, causes separation resulting in correlated radical pair electron spin polarization mechanisms, reminiscent of the electron cascade seen in natural photosynthetic systems.

The invention exploits the electrochemical cell characteristics of particulate semiconductors. It should be noted that while a myriad of semiconductors can be utilized, titania is depicted herein for the sake of illustration.

As depicted in FIG. 1A, semiconductors have an energy band structure characterized by a gap between the highest occupied energy level 12 (or valence band) and the lowest unoccupied energy level 14 (or conduction band). In the case of titanium oxide, the gap is 3.2 eV. A single semiconductor particle 13 is depicted. The inventors have found that when the semiconductor particles are associated with dopamine, the band gap shifts to lower energies, of approximately 1.6 eV.

A disturbance in the energy level of the electrons in the valence band in the semiconductor is induced via illumination (FIG. 1B). Upon illumination with photons having energy greater than the band gap, an electron 16 is excited to the conduction band 14 while in the valence band 12 a positive hole 18 is created.

As depicted in FIG. 1C, the electrons and holes generated via the illumination can separate and diffuse to the surface of the semiconductor 13. This surface diffusion allows the diffused electrons and holes to react with electron hole transporters to undergo reduction reactions 20 and oxidation reactions 22, respectively. Specifically, these photo generated electrons and holes migrate to the particle/solute interface (the solute being a moiety 15 adjacent to the particle and perhaps covalently bound thereto).

An exemplary semiconductor for use in the invented construct is titanium dioxide ($TiO_2$).

A cornerstone of the invention is the juxtaposition of redox moieties to the particle. Without the utilization of such close proximity electrophillic and nucleophillic moieties, rapid recombination of the photo generated charge pairs (i.e. the electron 16 in the conductance band and the "hole" 18 in the valence band) occurs, particularly since the pairs are located on the same particle. As such, the inventors have devised machinery to convert light energy into chemical energy via a sequential electron transfer process whereby a series of electron trapping sites are utilized. The machinery serves to facilitate long distance charge separation by blocking the surface states of titania. This enhances the kinetics of desired reactions.

Figure 2:
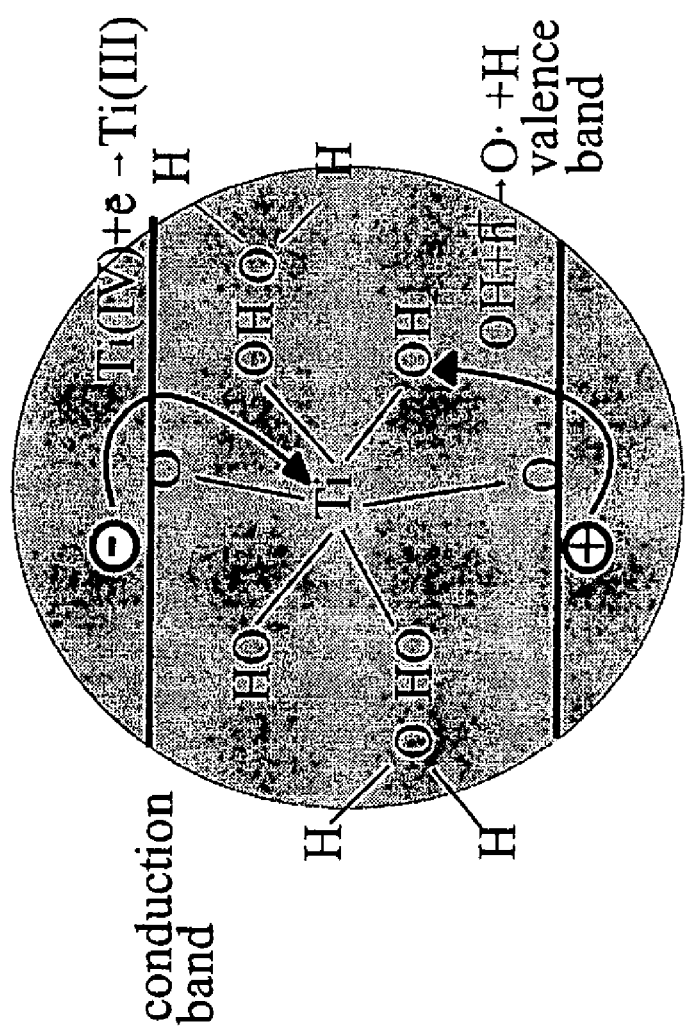
FIG. 2 is a schematic diagram of the fate of photo generated charge pairs on particulate semiconductors, in accordance with features of the present invention.

Electron Paramagnetic Resonance (EPR) has shown that electrons which have been energized to the conduction band are trapped as reduced metal centers; in the case of $TiO_2$ the electrons facilitate reduction of Ti (IV) to Ti (III). Concomitantly, the holes left in the valence band are trapped as oxygen centered radicals covalently linked to surface titanium atoms. A schematic diagram of this phenomenon is provided as FIG. 2.

The design of the photocatalyst allows the modification of the light harvesting properties of nanoparticles by changing the apparent band gap of metal oxide using surface modification with enediol ligands 15, as well as changing the driving force for hydrogen and oxygen evolution by changing the $TiO_2$—$ZrO_2$ composition of the semiconductor particle 13. The $TiO_2$—$ZrO_2$ composites will be prepared by procedure similar to that described herein for $TiO_2$ with addition that $TiO_2$ precipitation will be performed in the presence of different concentrations of $ZrOCl_2$. Coprecipitation of $TiO_2$ in the presence of Zr ions will result in ternary $Ti_xZr1-xO_2$ semiconductor with variable electronic properties. Suitable protocols for production of Ti—Zr films include M. D. Hernandez, et al., *Thin Solid Films* 502 pp 125-131 (2006), and C. Fan et al., *Applied Physics Letters* 75, pp 340-242 (1999), both incorporated herein by reference.

In one embodiment, a dopamine-conjugated semiconductor particle 13 (e.g. $TiO_2$) has a band gap of around 1.6 eV (780 nm) with the band edge within the range of water splitting. Therefore, this photocatalyst utilizes most of the visible light spectrum. The $ZrO_2$ can be photo excited at an energy level more negative than hydrogen evolution. Therefore, the $TiO_2$—$ZrO_2$ coupling discussed herein as an exemplary semiconductor particle 13 has enough driving force to oxidize water as well as reduce the proton to hydrogen. The dopamine-conjugated nanocrystalline particle (e.g. $TiO_2$—$ZrO_2$) also localizes the hole on the ligand to increase charge separation and reduce recombination rates. It should be noted that while a $TiO_2$—$ZrO_2$ particle combination is illustrated herein, other nanocrystalline particles are also suitable semiconductor platforms, including, but not limited to PbO, $Tb_2O_3$, $La_2O_3$, and combinations thereof.

The invention provides a durable, efficient photoconversion system for hydrogen production, wherein a photoelectrochemical device is utilized to separate catalytically active species (i.e., the electrons and holes) as they are produced. This eliminates or at least minimizes energy-wasting recombination (electron and hole) pathways. The system also separates potentially sensitive materials from degradative reactions (e.g., the water oxidation).

Figure 3:
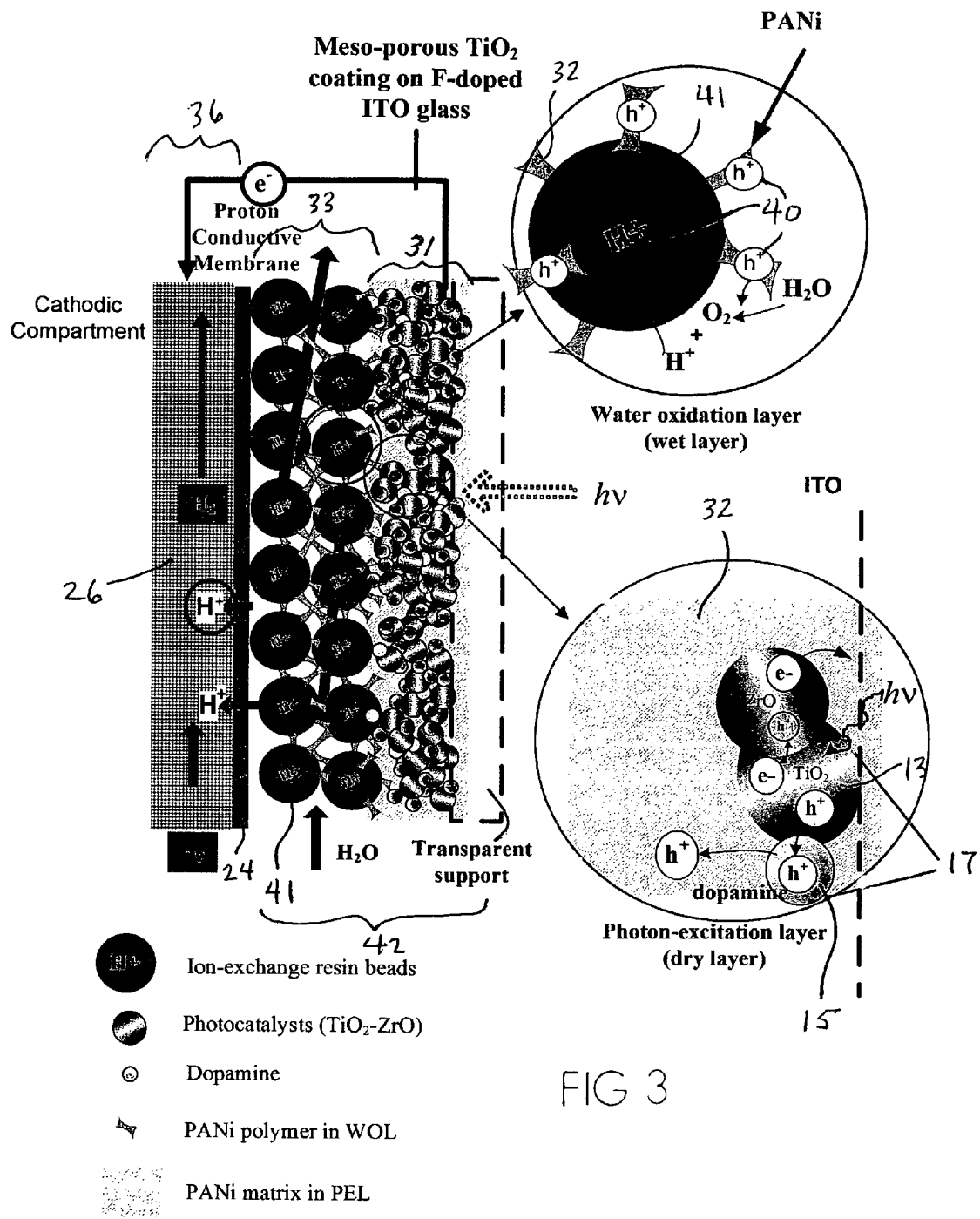
FIG. 3 is a schematic diagram of the system for photo converting light into electricity; in accordance with features of the present invention.

An embodiment of the instant invention, as depicted as numeral 30 in FIG. 3 provides a conjugated pathway network to transport the photo generated holes and electrons to isolated reaction sites. This design ultimately mimics photosynthesis. Surface-modified nano structured photocatalysts 13, such as the $TiO_2$—$ZrO_2$ construct, are utilized for their ease of charge separation and conjugation into a conductive network to separate the holes and electrons. Thus, such an arrangement offers an efficient pathway for energy utilization. U.S. Pat. No. 6,677,606, incorporated herewith and co-owned, provides a more detailed description of the fabrication of the surface modified photocatalysts suitable for use with the instant invention.

Electrically conductive polymer is linked to the ligand (e.g., dopamine) to transfer holes away from the photoexcited site. This results in a rapid extended charge pair separation.
Multi-compartment Design In order to produce high-purity hydrogen, ions are transported to isolated compartments, thereby separating the oxidation and reduction reactions from each other. The PEC design depicted in FIG. 3 allows oxygen evolution and hydrogen production to be isolated in a two-compartment reactor, i.e., an anodic compartment 34 and a cathodic compartment 36 for water oxidation (oxygen evolution) and proton reduction (hydrogen evolution), respectively. This plurality of compartment design obviates the need to separate hydrogen gas from oxygen and contaminants, saves energy, and therefore reduces production costs.

A dual compartment design of the anodic compartment 34 facilitates critical transport pathways. Specifically, a two-dimensional structure of the PEL 31 enables light transmission to the nano-structured photocatalyst. A porous three-dimensional structure water oxidation layer (WOL) 33 offers a pathway for water flow to the catalytic oxidation sites. The WOL is fabricated from porous resin substrate such as beads, element 41 in FIG. 3 (commonly available), to form wafers, the later of which are described in Y. J. Lin (U.S. Patent Application 2006/0063849) co-owned and incorporated herewith. The loosely packed resin substrate (whereby spaces exist between individual resin entities to allow water to flow therethrough) provides less restricted reaction sites (not co-localized on the photo catalyst). Thus, water oxidation will no longer be a bottleneck to photocatalysis. Consequently, the recombination rate may be reduced due to the driving force of water oxidation that will adsorb the holes. The cation resin beads that adsorb protons also significantly enhance the conductivity of proton transportation in the water by at least one order of magnitude.

As noted supra, in the cell, photocatalytic oxidation of water occurs, and is substantially confined to, the WOL 33 of the anodic compartment 34. Protons 40 generated from the water oxidation are transported across a proton conductive membrane (PCM) 24 to the cathodic compartment 36 for electrochemical reduction to form hydrogen gas.

The anodic compartment comprises a dual-layer composite matrix to facilitate the photocatalytic reaction. This dual-layer design to separate the photon-excitation site from the water oxidation site prevents chemical attack from water oxidation. No co-catalyst is used on the photo catalyst thus further preventing material degradation due to anodic corrosion. The completely dry photo electrochemical layer (PEL) is also protected from water damage. Specifically, the dry photo electrochemical layer minimizes contact from water which often contains contaminants that could poison the photon-excitation constituents.

The first layer, i.e., the photon-excited layer, contains mixed nanoparticles of electrode (e.g., the metal oxide semiconductor) 13 and the photocatalyst 15 resulting in a composite particle 17 (e.g., dopamine functionalized nanocrystalline $TiO_2$—$ZrO_2$). These composite particles are embedded in an electric conductive polymer 32 so as to be substantially physically isolated from adjacent structures or fluids. The embedment of the composite particles nevertheless allow them to be in electrical communication with each other and the polymer. The polymer 32 serves as a means for isolating the composite particle from water or other fluid permeating through the water oxidation layer while simultaneously allowing electrical communication between the composite particle and adjacent structures and fluids.

The electric conductive polymer (ECP) 32, such as polyaniline (PANi) also is used to transport the holes from the photo excitation layer (PEL) 31 to the water oxidation layer (WOL). Specifically, the electric conductive polymer is covalently linked to the dopamine to transfer the holes out from the dopamine and into the WOL. While a myriad of conductive polymers such as polypyrroles or polythiophenes are suitable electrical conduits, for illustrative purposes, PANi is discussed herein. The general formula of PANi is [(-B-NH-B-NH-)y(-B-N=Q=N-)1-y]x in which B and Q denote $C_6H_4$ rings in the benzenoid and quinonoid forms, respectively. Thus, aniline polymers are basically poly(p-phenylene-imineamine)s, in which the neutral intrinsic redox states can vary from that of the fully oxidized pernigraniline (PNA, y=0), to that of the fully reduced leucoemeraldine (LM, y=1). PANi is reported to have very good electric conductivity and is easily synthesized. A suitable protocol for synthesis is found in Kang, E.T. et. al, "Polyaniline: a polymer with many interesting intrinsic redox states" Prog. Poly. Sci. 23,. 277-324, 1998, and incorporated herein by reference.

As noted supra, PANi is the hole conducting matrix that links the photon excitation layer (PEL) and water oxidation layer (WOL) 34. The electron on the nanocrystalline $TiO_2$—$ZrO_2$ cannot recombine with the hole but instead is sequestered or captured by the nanoporous carbon electrode. The electrons are collected from the electrode network and flow to the cathode by integrated coupling via suitable electrically conductive material such as wires.

A means is provided for physically supporting the dual layers of the dry photon excited layer (PEL) 31 and wet water oxidation layer 33 on a transparent support 35. (It is understood that the support 35 is substantially transparent to that type of excitation radiation utilized to activate the system.) Specifically, the PEL 31 is formed as a thin mesoporous layer of 1-100 μm thickness on a transparent support 35 such as indium-tin oxide (ITO) glass by a surfactant templating procedure. A protocol for such thin film deposition is found throughout the literature, including Yang, P. et al, "Generalized synthesis of large-pore mesoporous metal oxides with semicrystalline frameworks" Nature 396 152-155, 1998 and Zukalova, M et al, "Organizing mesoporous $TiO_2$ films exhibiting greatly enhanced performance in dye-sensitized solar cells" Nano Letters 5 1789-1792, 2005]; these references incorporated herein by reference. ITO-coated glass is conductive and therefore enables coupling to transfer the photogenerated electrons out of the PEL. Other thin layer supports such as carbon nanotubes could also be used.

The transparent support allows excitation radiation (such as light from a remote source) to enter the confines of the device and impinge upon the $TiO_2$—$ZrO_2$-dopamine construct.

Positioned medially from the PEL 31 is the wet water oxidation layer (WOL) 33. In the illustrated embodiment, the water oxidation layer is positioned intermediate the photon excited layer 31 and the proton conductive membrane (PCM) 24. In as much as the electrically conductive polymer (PANi) is thoroughly and homogeneously mixed throughout the photon-excitation layer, the polymer prevents penetration of water into the dry photoelectrochemical layer. This photo electrochemical layer separation from the water oxidation layer prevents the corrosive components of water from attacking the metal semiconductor. In one embodiment, the WOL overlays the PEL layer on the same side of the support glass, such that the PEL is positioned intermediate the WOL and the glass. In this instance, exposure of PEL to excitation radiation (such as visible light) is maximized.

The WOL 33 comprises a three-dimensional structure containing cation-exchange resin material molded by the same ECP that transports the holes from the PEL $TiO_2$—$ZrO_2$-dopamine construct. Methods of fabricating the resin materials into a porous substrate are described in Y. J. Lin (U.S. Patent Application 2006/0063849) and are incorporated herein by reference. Generally, the individual resin substrates (i.e. beads) are immobilized relative to each other by the action of the ECP.

Water oxidation requires four holes per $O_2$ molecule. Heterogeneous catalysts, such as $RuO_2$, $IrO_2$, $RhO_2$, or combinations thereof, are deposited on the resin to facilitate water oxidation. The huge adsorption capacity of cation resin beads provides a proton sink to adsorb the protons generated by the water oxidation. A myriad of cation resins are suitable sinks and are commercially available. Exemplary substrates and their applications are described in the following references, all of which are incorporated herein by reference: U.S. Pat. No. 6,495,014 entitled Electrodeionization substrate, and device for electrodeionization treatment; U.S. Pat. No. 6,797,140 entitled ElectroDeIonization method; U.S. Patent Application No. 20060065540 entitled Retention of counterions in the separative bioreactor; U.S. Patent Application No. 20060063849 entitled Electronically and tonically conductive porous material and method for manufacture of resin wafers therefrom; U.S. Patent Application No. 20060062988 entitled Devices using resin wafers and applications thereof; U.S. Patent Application No. 20050056547 entitled Single-stage separation and esterification of cation salt carboxylates using electrodeionization; and U.S. Patent Application No. 20040115783 entitled Immobilized biocatalytic enzymes in electrodeionization (EDI).

Typical ionic resin substrates include beads such as Dowex™ or Purolite™ cation exchange resins.

Hydrogen Gas Production Detail

The electrons generated from photo excitation provide the driving force for proton transport, via the ion exchange resin network, across a proton conductive membrane (PCM) 24 to the cathodic compartment 36. The combination of an electric communication between the protons and the PCM and the electrical gradient established between the anodic and cathodic compartments provides the driving force for proton transport to the cathodic compartment.

Hydrogen will be generated at the cathode 26 from the transported protons and electrons. Trace amounts of carbon dioxide in the water will probably be present as carbonate in the acidic environment and will not transport across the PCM. These trace amounts of carbon dioxide evolve with the oxygen.

In the cathodic compartment, the proton is electrically transferred into the porous cathode for hydrogen evolution. Platinum electrodes, Pt-coated titanium oxide electrodes or other hydrogen evolution electrodes are suitable. An electrolyte such as dilute acid will be used in the cathodic compartment to maintain the conductivity for proton transport. With low concentrations of $CO_2$ in the system, the $H_2$ produced will contain only trace amounts of CO. Therefore, the instant design produces a very clean hydrogen gas stream.

The illustrations and protocol provided herein utilize titanium dioxide as the semiconductor particle, solely for illustrative purposes. A myriad of metal oxides are suitable particle candidates. As such, aside from the titanium dioxide, other nanocrystalline (1-20 nm) octahedral metal oxides such as $VO_2$, $ZrO_2$, $Fe_3O_4$, $Fe_2O_3$, ZnO, $MnO_2$, NiO and CuO could be used.

As mentioned supra, it is preferable that the semiconductors utilized be of an octahedral structure when dopamine or some similar dihydroxyl phenyl molecule is utilized as a surface modifier. Octahedral structure of the foundation nanocrystalline material is necessary in the illustrated construct so as to facilitate relatively unhindered coupling with the bond angles provided by the dopamine bridging group.

Generally though, any nanocrystalline material and modifying surface molecule, which when combined maintain their respective surface geometries, are suitable components of a redox pair.

Regarding semiconductor surface modifiers, a myriad of multifunctional ligands are suitable. Such ligands should have groups with varying donor acceptor character, selective binding of reactants, and for the binding to the surface of the semiconductor particle. Preferably, suitable molecules used for the surface derivatization of the semiconductor particle will bind a wide selection of organic, electrically conductive polymers. The following is a list of suitable bidentate and tridentate functional moieties:

mercapto (SH) amino (—$NH_2$) α-hydroxyl (—OH—OH) carboxyl (—COOH) phosphono (P(O)(OH)$_2$)

These moieties can be present in different combinations, relative positions and hydrocarbon chain lengths. As noted supra, the choice of modifier molecules also will be dependant upon the bond angle geometry of the foundation nanocrystalline semiconductor material.

Particle-Molecule Preparation Detail

All the chemicals were reagent grade and used without further purification (Sigma, Aldrich or Baker). Triply distilled water was used. The pH was adjusted to pH 3.5 with NaOH or HCl. Oxygen was removed by bubbling with argon or nitrogen. Colloidal $TiO_2$ was prepared by drop wise addition of titanium(IV) chloride to cooled water. The temperature and rate of component mixing of reactants were controlled by conventional apparatus developed for automatic colloid preparation. The inventors used an apparatus as described in M. C. Thurnauer, *Acta Scandinavica* 51, pp. 610, (1997), and incorporated herein by reference.

The concentration of $TiO_2$ (0.1-0.6 M) was determined from the concentration of the peroxide complex obtained after dissolving the colloid in concentrated $H_2SO_4$, as described in Thompson, *Inorganic Chem.*, 23, p 1794, (1989) and incorporated herein by reference. Surface modification of $TiO_2$ with ascorbate resulted in the charge transfer complex with optical properties which were described in T. Rajh, *J. Phys. Chem. B.*, 103, pp 3513, (1999), and also incorporated herein by reference. Dopamine was also used for surface modification of $TiO_2$ but the onset of absorption in this system was further shifted to 810 nm.

The following specific protocol was utilized:

Dopamine was added into $TiO_2$ colloidal solutions at $8<pH<2.5$. Immediate development of red color indicates instantaneous formation of the charge transfer complex between dopamine and $TiO_2$. The amount of adsorbed dopamine can be determined by measuring absorption at 440 nm, at extinction coefficient of $3.3\times10^3\ M^{-1}\ cm^{-1}$, absorption at 520 nm at an extinction coefficient of $1.1\times10^3\ M^{-1}\ cm^{-1}$, or in higher concentrations with absorption at 570 nm with an extinction coefficient of $1\times10^2\ M^{-1}\ cm^{-1}$. Alternatively, mesoporous $TiO_2$ layers coated with dopamine by immersion in 0.1 M dopamine HCl for 1-100 hours are suitable.

Conjugation of PANi Film to Dopamine-$TiO_2$ Detail

Conjugated PANi-dopamine-$TiO_2$ layers were formed either by chemical addition of PANi to mesoporous dopamine-$TiO_2$ (as described in T. Rajh et al "Charge transfer across the nanocrystalline-DNA interface:probing DNA recognition" Nano Letters 4 1017-1023, 2004, and incorporated herein by reference); or by electrochemical polymerization of aniline directly onto a mesoporous dopamine-$TiO_2$ coated anode (as described in H. Yang and A. Bard "The application of fast scan cyclic voltammetry. Mechanistic study of the initial stage of electropolymerization of aniline in aqueous solutions" J. Electroanal. Chem 339 423-449 1992 and J. Bacon and R. Adams "Anodic oxidations of aromatic amines. III. Substituted anilines in aqueous media" J., Am. Chem. Soc. 90, 6596-6599 1968, both incorporated herein by reference.)

Alternate Electron Hole Transporter Detail

In one embodiment of the invention, the wet oxidation layer and ion exchange membranes are replaced with an electron hole transporter. An illustration of this embodiment is designated in FIG. 4 as numeral 50. Specifically, the PANi 32 is linked directly to a cathode 24 (comprising for example gold, platinum or any metal with similar electrical conductivities) to serve as a hole transporter completing the external circuit between the PEL anode and the cathode. Generally, any metallic or other electrically conductive material that could be attached to the hole transporter could be used as the cathode.

This embodiment represents a substantially completely dry photovoltaic device which does not require an externally supplied fluid to facilitate redox reactions. Rather, this embodiment utilizes photo excitation of the semi-conductor particle-ligand composite to generate protons and electrons. The electrons exit through an external circuit while hydrogen gas forms upon combination of protons at the cathode. The final result is the generation of electricity. A second, downstream system could utilize the hydrogen gas produced in a more typical fuel cell arrangement for additional electricity generation.

Figure 4:
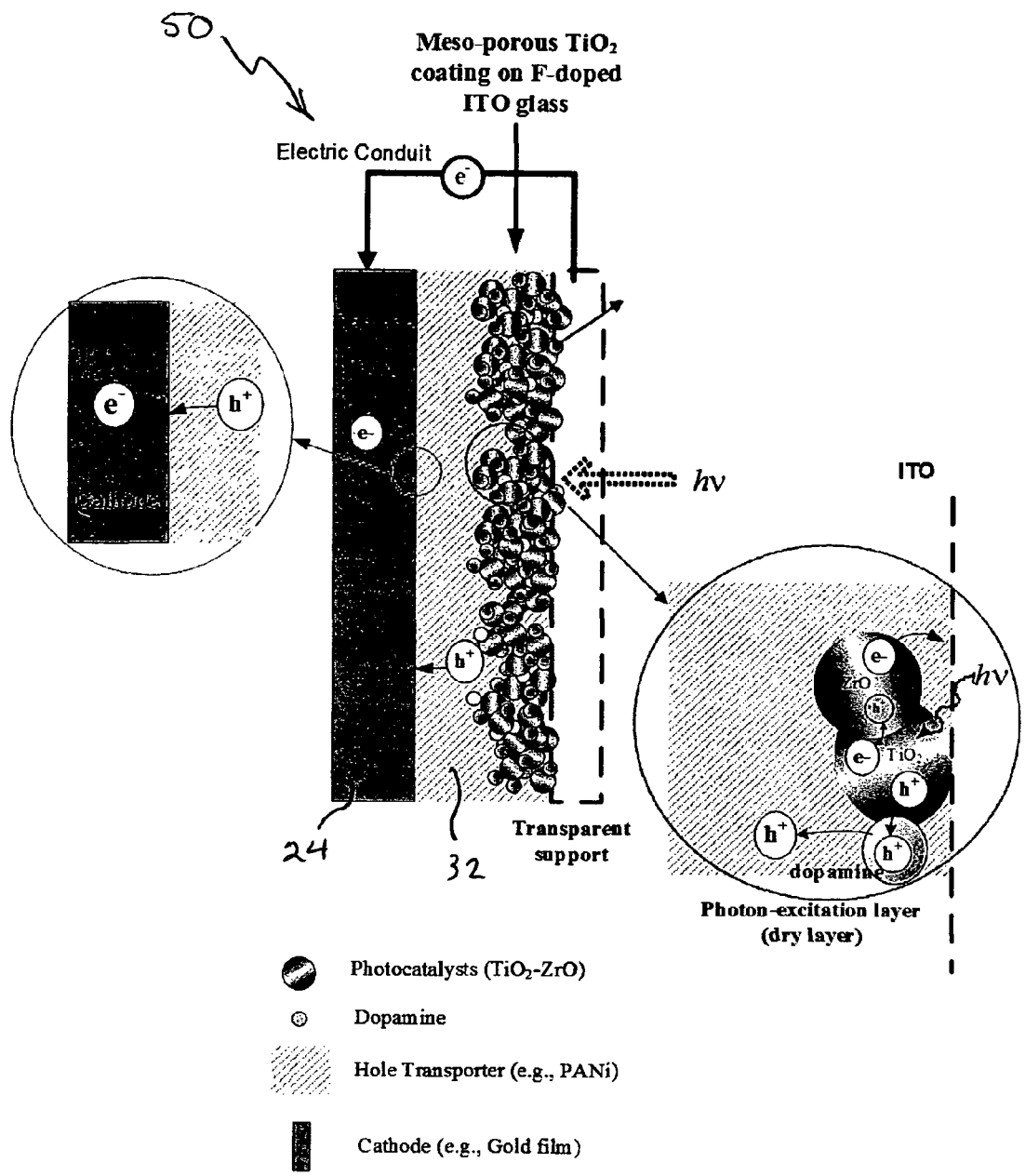
FIG. 4 is an alternative embodiment for photo converting light into electricity, in accordance with features of the present invention.

Alternatively, instead of a completely dry system as depicted in FIG. 4, a liquid redox couple could serve as the hole transporter in a mixed dry-wet device. An example of a wet redox couple is $I^-/I_3^-$.

As described above, the electron hole transporter here is electrically connected to the cathode to complete the external circuit to form a photovoltaic electricity generation device. This embodiment further provides physical contact (i.e. solid state hard wiring) between the proton-generating layer and the cathode. In this instance, photoexcitation produces an electric current in the solid state-constructed electric circuit.

In operation, the system provides an elegant protocol for generating electricity and hydrogen gas. Light photons contact the physically isolated but electrically accessible photon-excitation layer to produce a plurality of charge pairs, each pair consisting of an electron and a proton. The electrons exit the system via a standard conduit and, via an electrical gradient established, is applied to a load. The protons, while physically isolated from a redox fluid (the later externally supplied and replenished at regular intervals), electrically communicate and oxidize the fluid. Cations, which result from this oxidation, migrate to the cathode to form their respective valence-satisfied elemental form.

As an example of the photovoltaic electricity generating application, an electrochemical cell having an electrically conducting glass anode coated with a PANi-dopamine-$TiO_2$ layer 1 micron in thickness, a platinum cathode, and an electrolyte consisting of 0.5 M NaI/0.5 M phosphate buffer was constructed and operated as a photovoltaic cell. The cell was illuminated with light of different wavelengths ranging between 350 and 600 nm, and the current-voltage characteristic curve for the cell was measured. The values of the incident-photon-to-electricity conversion efficiency (IPCE) determined from the current-voltage curves were found to range from less than 1 percent for 600 nm light to 14 percent for 350 nm light.

Figure 5:
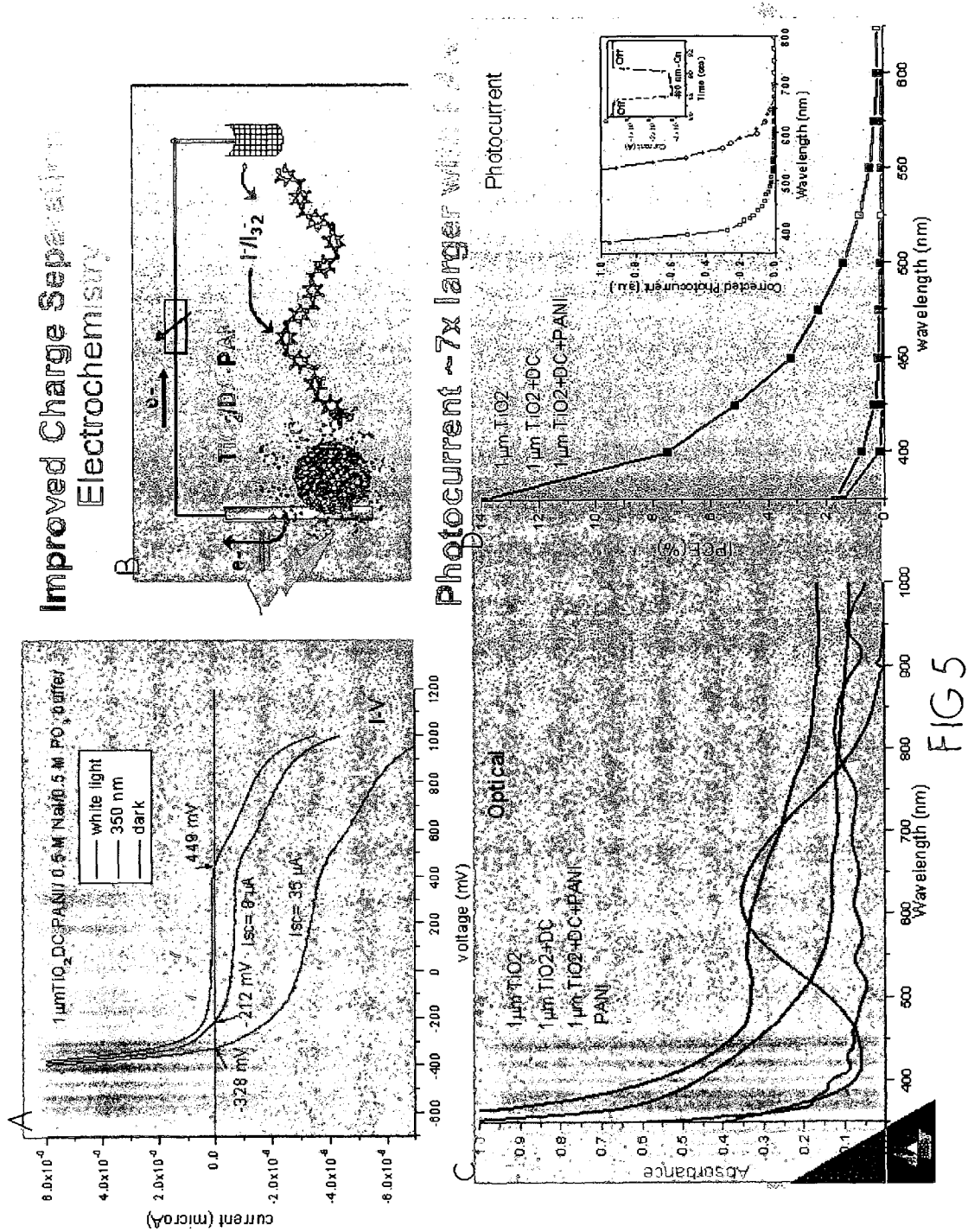
FIG. 5 is a series of graphs depicting photocurrent characteristics of the invented system, in accordance with features of the present invention.

FIG. 5A-D depicts the improved photocurrent characteristics provided by the invented system. FIG. 5D shows that the utilization of an electrically conductive polymer to facilitate charge transfer results in a seven fold increase in current, compared to when no polymer is present.

System Advantages

The invented single-step hydrogen production method significantly reduces costs by eliminating hydrogen gas separation and purification from oxygen and by eliminating other contaminants in the $H_2$ gas stream. In addition, by avoiding consumables and sacrificial reagents, the costs are largely limited to the cost of the PEC. The inventors estimate that the ion exchange resin/proton conductive membrane components of the system will cost about $250/$m^2$ while an operating PCM system such as electro dialysis is about $1500/$m^2$. A thin film of dopamine-functionalized nanocrystalline $TiO_2$—$ZrO_2$ will add only a small cost to the device.

Based on average solar fluxes (1 kW/$m^2$) and low-end prediction of conversion efficiency (9%), the inventors estimate that a square meter device could produce 200-500 kg $H_2$/yr. Using a conversion of 1 kg equaling 1 gal gasoline and an average vehicle traveling 10,000 miles at 20 MPG, a garage top device could supply transportation fuels for a two-vehicle family. A thin-film garage roof system with a continuous supply of clean water could produce enough cost-competitive H2 fuels to largely replace visits to the service station. This system would only emit oxygen and water supply impurities, and only require periodic module replacements.

While the invention has been described with reference to details of the illustrated embodiment, these details are not intended to limit the scope of the invention as defined in the appended claims. Hydrogen production from water splitting is the ultimate energy source that is not limited by carbon emissions or feedstock availabilities and, therefore, could have a major impact on the future energy supply chain. With progress in hydrogen related technologies, the invented device and substrate could provide distributed hydrogen production. Other classes of functionalized photo catalysts (e.g. SiC or semiconductor La), or similar other materials in development, can be incorporated into the described engineering design. Therefore, this device and substrate offer the opportunity to leverage technical improvements in materials developed outside of the invented device and substrate and increase overall performance of the PEC.

The embodiment of the invention in which an exclusive property or privilege is claimed is defined as follows:

1. A system for separating oppositely-charged charge carriers, the system comprising:
   a) an electrically conductive support;
   b) a semiconductor attached to the support, the semiconductor adapted to receive radiation so as to generate electrons and holes;
   c) a ligand covalently attached to said semiconductor to form a construct; whereas the holes are localized on the ligand;
   d) an electric conduit attached to said ligand so as to physically isolate the construct from adjacent structures or fluids;
   e) a porous resin wafer fabricated from ion exchange resins in electrical communication with the electric conduit;
   f) an electron hole transport membrane such that said resin wafer is positioned intermediate the construct and said membrane;
   g) a cathodic compartment containing electrolyte, such that said membrane is positioned between the cathodic compartment and resin wafer; and
   h) an electrical connection between said cathodic compartment and the conductive support.

2. The system as recited in claim 1 further comprising a means for inducing said semiconductor into a photoexcited state.

3. The system as recited in claim 2, wherein said semiconductor further comprises a valence band and a conductive band, whereby the valence band contains electrons.

4. The system as recited in claim 3, wherein the photo excitation causes the electrons to relocate to the conductance band.

5. The system as recited in claim 1, wherein said ion-exchange resin is a cation-exchange resin and said ion-exchange membrane is a cation exchange membrane.

6. The system as recited in claim 1, wherein said semiconductor is an oxide selected from the group consisting of $TiO_2$, $VO_2$, $ZrO_2$, $Fe_3O_4$, $MnO_2$, NiO, CuO, PbO, $La_2O_3$, $Tb_2O_3$ and combinations thereof.

7. The system as recited in claim 1, wherein said ligand is a polydentate modifier selected from the group consisting of 1,2 dihydroxyl phenylamine, 1,2-dihydroxyl phenyl alanine, 1,2-dihydroxyl benzoic acid, 1,2-dihydroxy glycine, 1,2 dihydroxy benzyl amine, and combinations thereof.

8. The system as recited in claim 1 wherein said ligand is a polydentate moiety selected from the group consisting of SH, NH2, —OH—OH, —COOH, P(O)(OH)2, and combinations thereof.

9. The system as recited in claim 1, wherein said ligands are dihydroxyl phenyls.

10. The porous resin wafer described in claim 1, wherein said resin wafer is a porous matrix comprising a mixture of immobilized ion-exchange resin substrate and conductive polymer.

11. The system as recited in claim 1 wherein said ligands are electron donors.

12. The system as recited in claim 1 wherein said electrical conduit is an electrically conductive polymer selected from the group consisting of polyaniline, polypyrrole, polythyophenes, and combinations thereof.

13. The system as recited in claim 1 wherein the semiconductor has an energy band characterized by a gap between the semiconductor's valence band and the semiconductor's lowest unoccupied energy level and that the energy band shifts to lower energies when the ligand is attached to the semiconductor.

14. A substantially dry system for simultaneously generating hydrogen gas and electricity, the system comprising:
   a) a plurality of photocatalysts;
   b) an electrically conductive polymer substantially encapsulating the photocatalysts;
   c) a cathode in electrical communication with the polymer; and
   d) an electrical conduit electrically connecting the photocatalysts to the cathode.

15. The system as recited in claim 14 wherein the polymer is connected to the cathode to complete an external circuit.

16. The system as recited in claim 14 including a means for contacting the plurality of photocatalysts with excitation radiation so as to produce an electric current.

* * * * *